Oct. 25, 1927.

C. P. EISENHAUER 1,646,581

WATER SOFTENER

Filed July 26, 1926

INVENTOR.
CHARLES P. EISENHAUER.
BY
ATTORNEYS.

Oct. 25, 1927.  
C. P. EISENHAUER  
1,646,581  
WATER SOFTENER  
Filed July 26, 1926  
7 Sheets-Sheet 4

INVENTOR.  
CHARLES P. EISENHAUER.  
BY  
ATTORNEYS.

Oct. 25, 1927.
C. P. EISENHAUER
1,646,581
WATER SOFTENER
Filed July 26, 1926
7 Sheets-Sheet 5
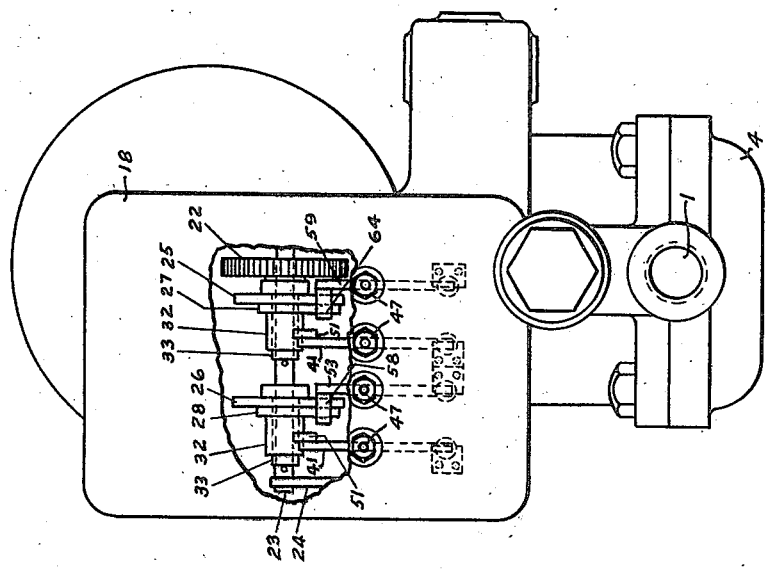
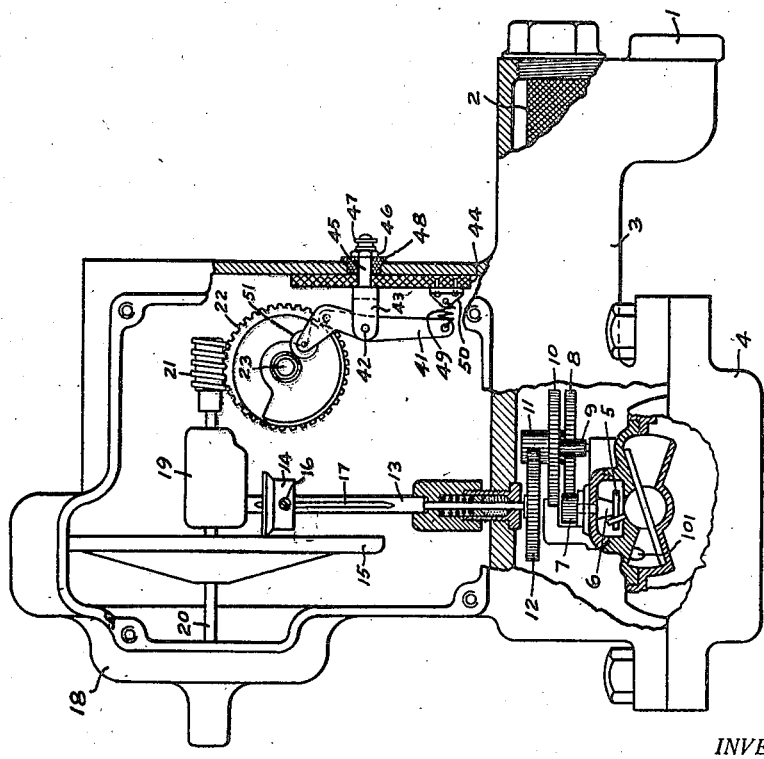
INVENTOR.
CHARLES P. EISENHAUER.
BY
ATTORNEYS.

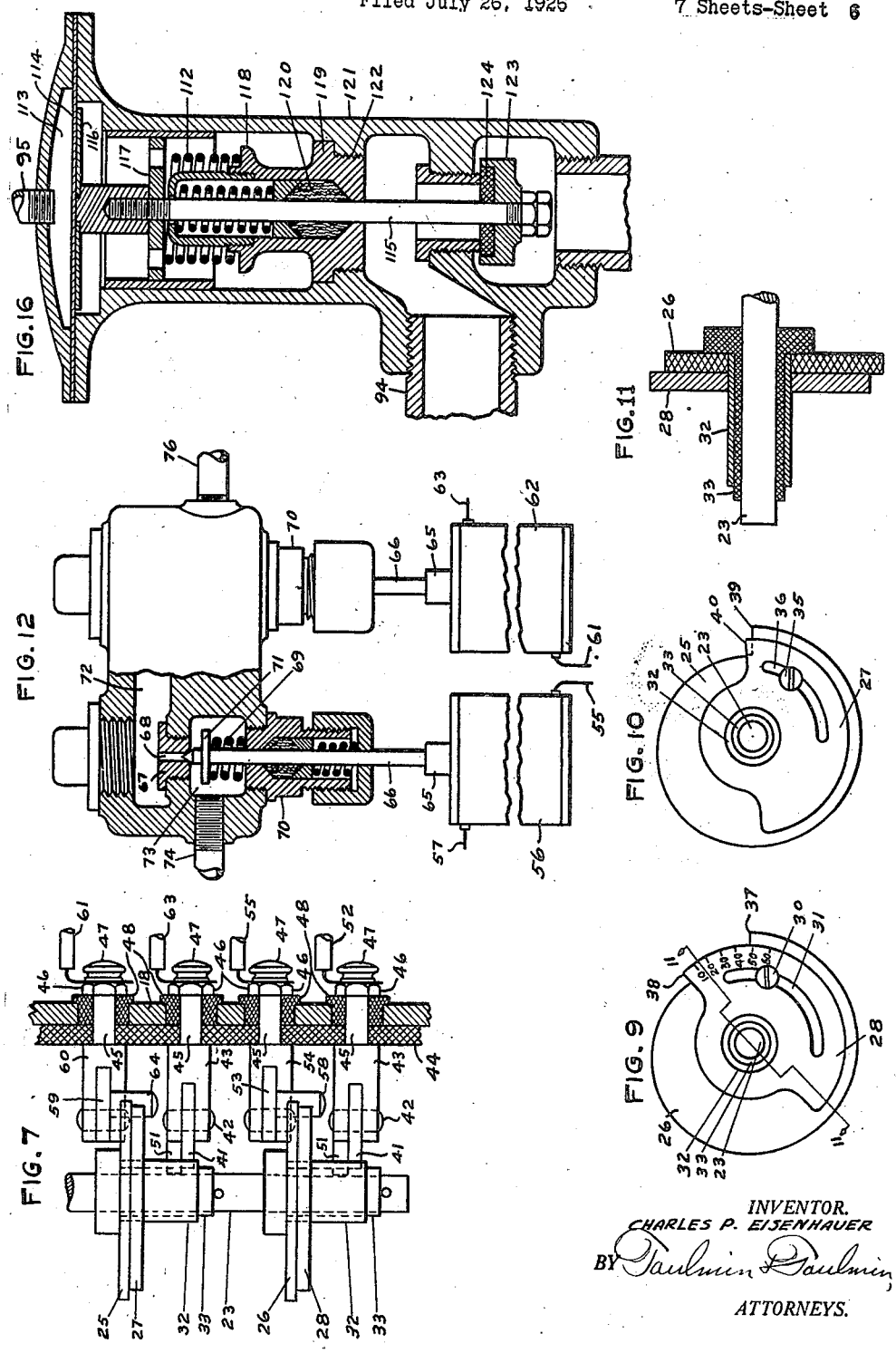
Oct. 25, 1927.  C. P. EISENHAUER  1,646,581
WATER SOFTENER
Filed July 26, 1926   7 Sheets-Sheet 6
INVENTOR.
CHARLES P. EISENHAUER
BY Taulmin Taulmin
ATTORNEYS.

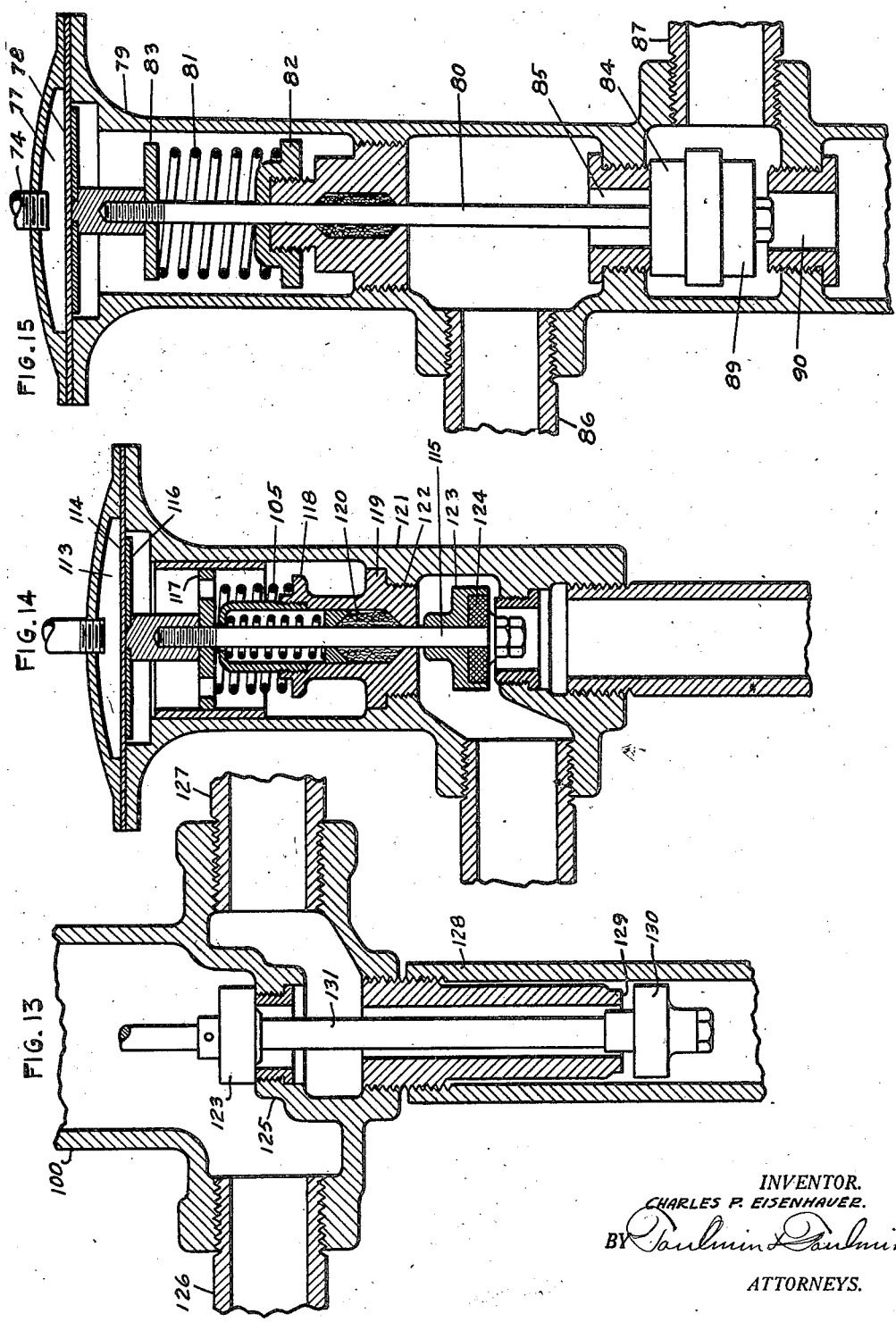

Patented Oct. 25, 1927.

1,646,581

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER SOFTENER.

Application filed July 26, 1926. Serial No. 124,931.

My invention relates to water softeners and particularly to an automatic water softener.

It is the object of my invention to provide an automatic water softener characterized by utilizing a brine tank under pressure from the incoming hard water and further characterized by having the system controlled by water passing through a control device, such as a meter.

It is my further object to provide such a system in which the meter controls a pair of master valves which are electrically operated, said master valves in turn controlling the brine water and the flush water application through relatively remote hydrostatic valves which are regulated by the master hydrostatic or needle valves controlling the application of hydrostatic power thereto.

Referring to the drawing:

Figure 6 is a detail view with the cover of the meter removed, the meter actuated mechanism, the meter actuated cams and the contact rollers;

Figure 7 is a detail plan view of the contact rollers and cams;

Figure 8 is an end elevation of the contact rollers and cams and associated mechanism;

Figure 9 is a detail view of one side of the flush water cams and insulating disks showing the adjustable cam;

Figure 10 is a detail elevation of the same mechanism for brine control;

Figure 11 is a section on the line 11—11 of Figure 9;

Figure 12 is an elevation partially in section of the master control needle valves for controlling the flush water and salt water or brine, together with their actuating electrical mechanism;

Figure 13 is a section through the hard water by-pass valve;

Figure 14 is a section through the type of valve that is normally open;

Figure 15 is a section through the brine control valve;

Figure 16 is a section through the type of valve that is normally closed;

Figure 1:
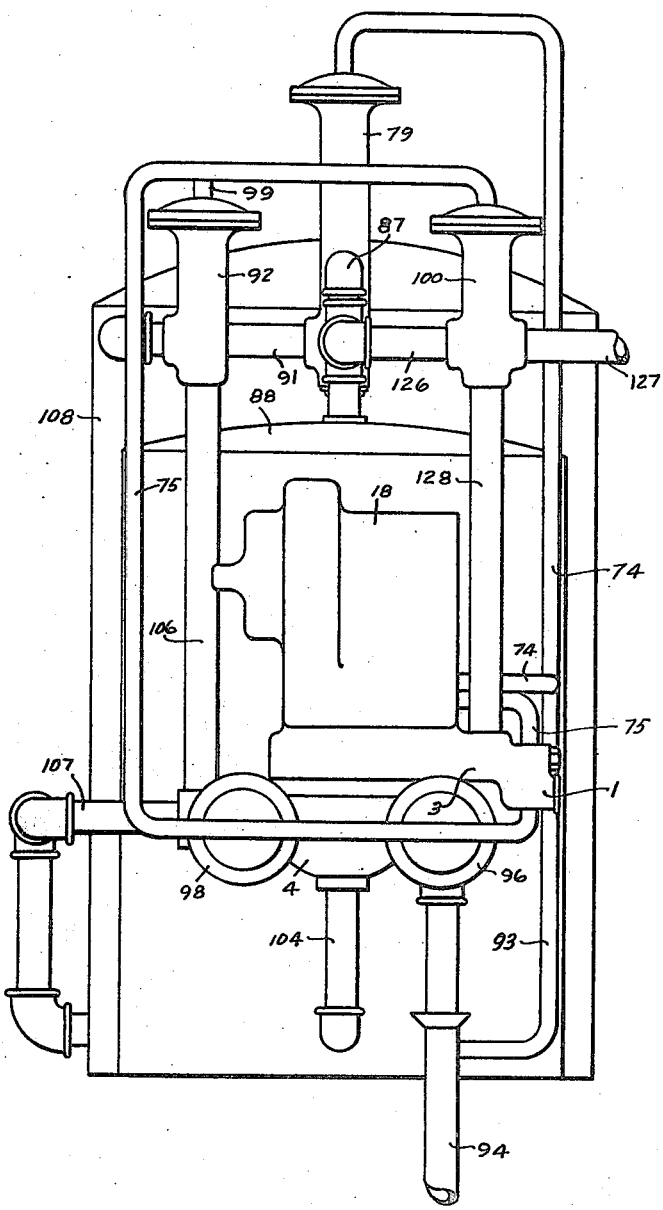
Figure 1 is a front elevation.
Figure 2:
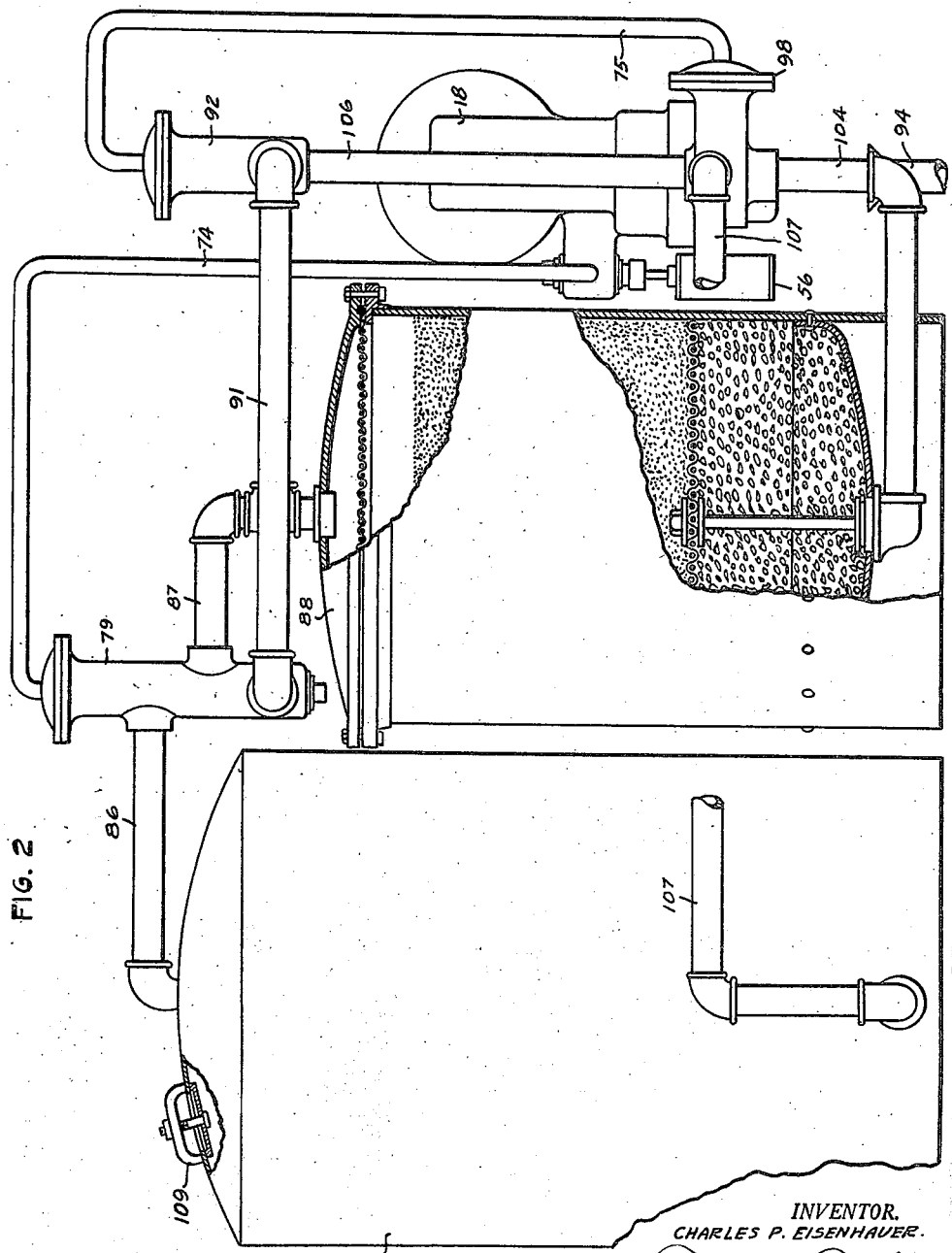
Figure 2 is a side elevation with the softener tank in section.
Figure 3:
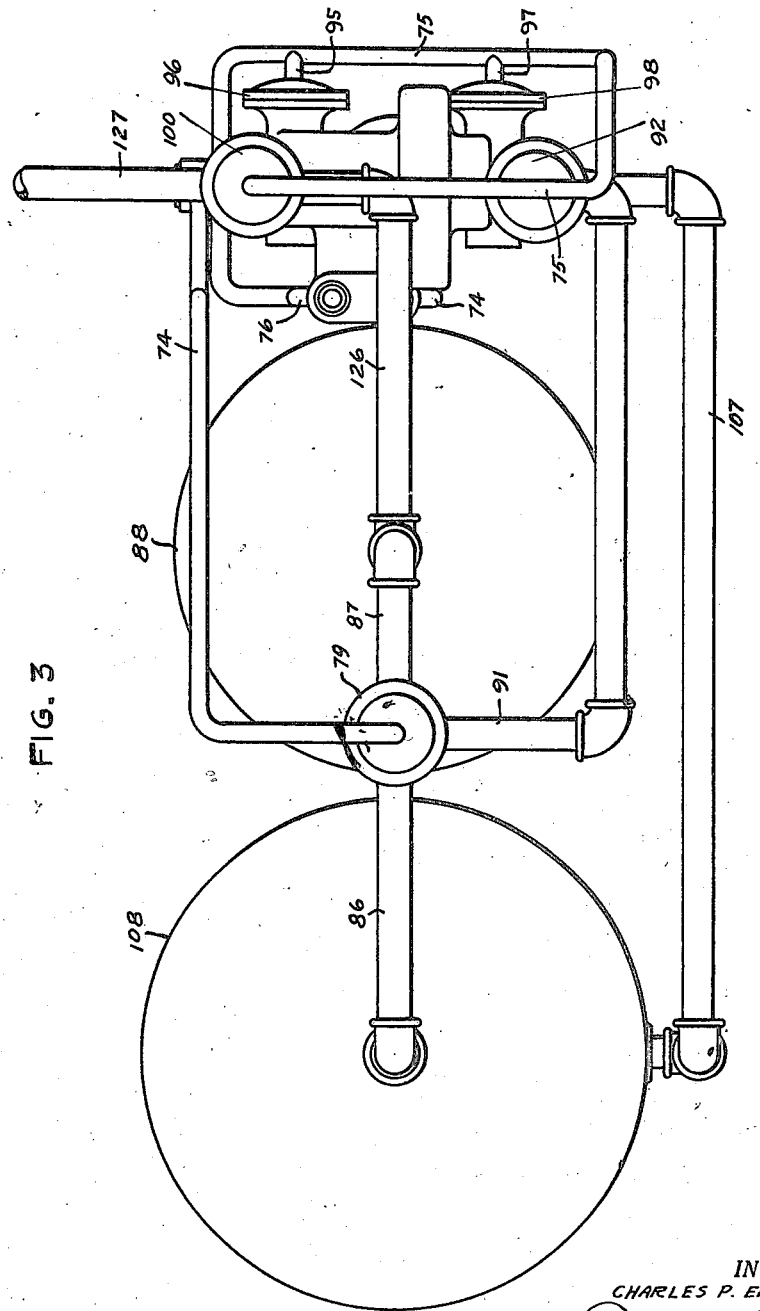
Figure 3 is a plan view.
Figure 4:
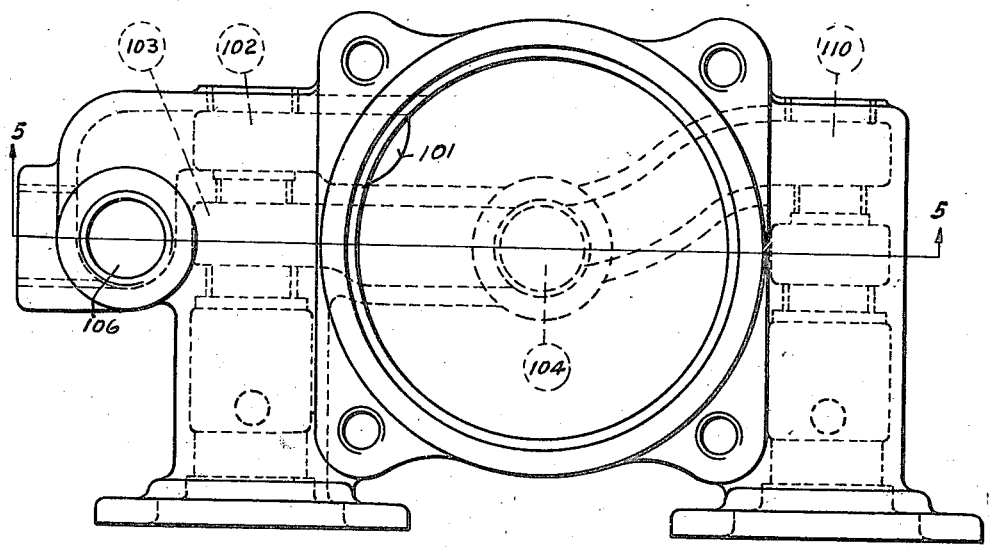
Figure 4 is a plan view showing the arrangement of ports in the meter base and the valves controlling such ports in dotted lines.
Figure 5:
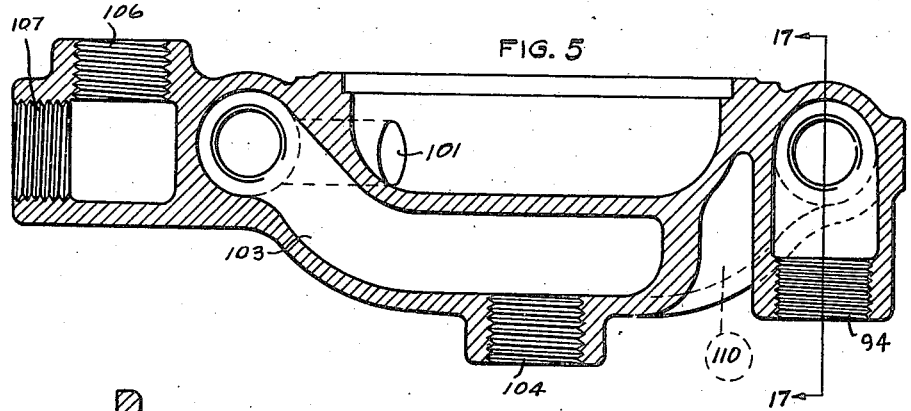
Figure 5 is a section on the line 5—5 of Figure 4 showing the construction of ports in the meter base.
Figure 17:
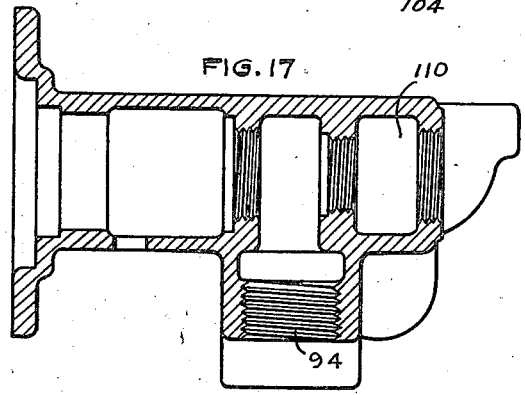
Figure 17 is a section on the line 17—17 of Figure 5.

Referring to the drawings in detail, 1 is the inlet hard water line which passes through a screen 2 into the main inlet passageway 3, thence into the meter chamber 4, the details of which will be hereinafter described, with the result that the meter disk 5 connected to the shaft 6 actuates the pinion 7 which in turn actuates the gear 8, pinion 9, gear 10, pinion 11, gear 12 and shaft 13. This shaft 13 carries a driving member 14 which engages with a disk 15. The relative position of the driving member and disk may be regulated by the set screw 16 working in the slot 17 in the shaft 13. This disk is carried by a shaft 20 journaled at one end in the housing or casing 18 and further supported by a bracket 19 carried by the casing. On the other end of the shaft is a worm 21 engaging with a worm wheel 22 carried on a cam shaft 23 which is supported in a bracket 24.

This cam shaft carries a pair of adjacent contact insulating cam disks 25 and 26 which are made of insulating material of any desired character. On one side of said disks are the cams 27 and 28.

These cams are adjustable relative to the high point of the insulating cam disks by means of set screws 30 and 35 working in slots 31 and 36, said set screws being carried by the insulating cam disks. The extent of contact of the contacts, to be hereinafter described, with these metallic cam disks is determined by the setting of the disks relative to the high point of the insulating cam disk associated therewith.

These two metallic cam disks, known as transmitting disks, have a sleeve 32 connected to them, such sleeve being projected beyond them providing a surface for a contact roller. This sleeve is supported upon insulating sleeves 33 also mounted on the shaft 23.

The metallic fragmentary contact cam for controlling the application of brine is designated 27 and it is likewise adjustable by a screw 35 carried by the disk 25 working in the slot 36 in the cam 27.

The extent of the metallic cam 28 exposed between the end of the high point of the insulating cam at 37 to the end of the high point of the metallic cam at 38 determines the period during which the needle valve electrically controlled by the contacts thus made will remain open for the application of wash water or flush water. A similar adjustment determines the period of application of brine water in connection with the end of the high point of the cam 25 at 39 with respect to the end of the high point of the cam 27 at 40. A space between the ends of these two high points determines the period of electrical contact and a second actuation of the master control needle valve controlled thereby. 25 is the non-metallic cam.

The contact roller arm 41 is pivoted at 42 on a bracket 43 which is mounted on an insulating plate 44. The base of the bracket is connected by a terminal rod 45 to a washer 46 and nut 47 threaded thereon for engaging with an electrical wire. This rod 45 is insulated by an insulating sleeve 48 passing through the wall of the housing 18. This rocker arm 41 is connected at its lower end to a helical spring 49 which is attached to a bracket 50 mounted on the insulating plate 44. The function of this spring is to maintain this roller 51 carried on the upper end of the rocker arm 41 in engagement with the sleeve 32. The wire 52 connected to the terminal 45 leads to a source of current. A second rocker arm 53 is supported on a terminal bracket 54 which is connected in turn to the wire 55 which leads to the solenoid 56. The other end of the solenoid is connected by the wire 57 to the source of current. The rocker arm 53 carries a contact roller 58 which is adapted to rotate upon the insulating cam 26 and upon occasion upon the high point of the contact or transmitter cam 28. A third rocker arm 59 is carried on a terminal bracket 60 which is connected by the wire 61 to the solenoid 62, the other end of which is connected by a wire 63 to the source of current. The rocker arm 59 carries a roller 64 adapted to rotate upon the insulating cam 25 and upon the high point of the cam 27.

The closing of the circuit energizes the solenoid 56 and results in the movement of the armature plate 65 which carries with it the valve stem 66 which has a needle valve head 67 closing the needle valve aperture 68. This needle valve is normally closed by the helical spring 69 which surrounds it, such spring resting its lower end upon the plug 70 and its upper end upon a shoulder 71 on the valve stem 66. Fluid is admitted to the chamber 72 which passes through the passageway 68 into the chamber 73 and thence through the pipe 74 to actuate the desired hydrostatically operated valves.

The fluid for the actuation of such valves enters the chamber 72 through the passageway 75 which leads upwardly from the hard water line adjacent the meter.

The flush water control is identical with the salt control needle valve save that one controls the passage of fluid through the pipe 74 and the other through the pipe 76.

The pipe 74 proceeds upwardly to the hydrostatic chamber 77 over the diaphragm 78 and the brine control valve 79 actuating the brine control valve stem 80 against the resistance of the spring 81 which rests on a supporting collar 82 and against a shoulder 83 on the valve stem. This movement of the valve stem carries with it the valve member, one portion of which 84 seals the brine port 85 and prevents the passage of the brine through the line 86, through the line 87, thence to the top of the softener 88. The lower part of this valve member 89 is adapted to seal the passageway 90 communicating with the line 91 which is a flush water line controlled by the flush water valve 92. The line 74 is connected by the line 93 to the drain pipe 94.

The pipe 75 is connected by the pipe 95 to the drain valve 96 which is normally closed by a spring, by the pipe 97 to the reversing valve 98 which is normally closed by a spring. This line is also connected to the flush water valve 92 by the pipe 99 and to the by-pass valve 100.

Returning to the meter, it will be found that the water passes into the meter chamber 4 and through the opening 101 into the passageway 102 through the passageway 103 down the pipe connected to the bottom of the meter at 104 into the bottom of the softener. It will be noted that the reversing valve is normally open during softening.

It is maintained open by the spring 105. The passageway 102 is also connected to the pipe 106 which leads to the flush water valve 92 and the pipe 107 which leads to the bottom of the brine tank 108. The brine tank is supplied with a man hole 109 for inserting salt therein.

The pipe 107 also communicates with the passageway 110 which is controlled by the drain valve 96, which is normally closed by its spring 112. This controls the exit of fluid through the drain pipe 94.

Turning to the reversing valve 98, it will be noted that it consists of a diaphragm chamber 113, a diaphragm 114 and a valve stem 115 carrying a diaphragm plate 116 with which the diaphragm engages. The valve stem also carries a shoulder plate 117 against which one end of the spring 112 engages. The lower end of the spring rests upon the fixed shoulder of annular character, designated 118. This shoulder is carried by a sleeve 119 which contains the packing 120 and is threaded into the valve casing 121 at 122. The valve member consists of a plate 123 and a sealing washer 124. This valve 98 is normally open and controlled by hydrostatic pressure to reverse the course of the hard water from the softening tank to the brine tank to force the brine out of said brine tank and vice versa.

Such a valve as illustrated in Figure 16 is used for the drain valve and for the flush water valve. The valve shown in Figure 14 is similar, save that it is normally open, but is closed by the hydrostatic pressure. Similar numerals indicate similar parts.

The by-pass valve has a construction similar to that shown in Figure 16 save that the valve member 123 is located on top of the partition 125 instead of below it. This partition separates the passageway from the pipe 126 to the service pipe 127. Introduced into the bottom of the valve 100 is a by-pass pipe 128 which is provided with a valve seat 129 to receive a valve member 130 which is connected by the valve stem 131 to the service line valve member 123 and so arranged that when the valve member 123 is closed, the valve member is at open position, so that the water from the hard water line can flow directly into the service line when the service line is shut off from the water softener during regeneration.

Method of operation.

The method of operation of this softener is as follows. The hard water enters the hard water line passing through the meter actuating the meter and its accompanying mechanism, thence through the reversing valve 98 to the left side of the meter through the passages 101, 102, 103, pipe 104 to the bottom of the softener, up through the softener in the usual manner and out the top through the pipe 126 past the by-pass valve 100 and into the service line 127, and will continue to flow so long as the electrical contacts are not made through the agency of the contact cams.

However, when the electrical contacts are made, the solenoids 56 and 62 are both energized resulting in the opening of the needle valves, which allow hydrostatic pressure from the hard water line to enter the small pipes 75 and 74 thereby applying the hydrostatic pressure to a plurality of hydrostatic valves. Thus, the flush water control 92 which is effected through pipe 75 conveys pressure over the brine valve opening 85, the valve member 84 allowing the brine which is under pressure from the incoming hard water through the line 107 to be forced through the pipe 86 into the softener 88 at the top, down through the softener, up through the pipe 104, through the passageway 110 past the brine valve 79 which is now open by the pressure in the line 75 to the drain 94. The reversing valve 98 has been closed by the hydrostatic pressure in the line 75 preventing the passage of the brine through the passageway 103 into the passageway 102. The hydrostatic pressure in the line 75 has also opened the flush water valve 92 and has operated the by-pass valve 100 so that no water can flow from the softening system into the service line but hard water can flow from the hard water line through the pipe 128 into the service pipe 127. The valve member 84 carries with it the valve member 89 sealing the opening or valve seat 90 preventing the passage of brine into the line 91. The brine continues to flow so long as the contact is made on the cam 27 between the points 39 and 40. As soon as this contact is broken, the solenoid 62 is deenergized and its spring closes the needle valve shutting off further soft water because hydrostatic pressure on the salt valve is relieved allowing the valve 84 to close and open the port 90, but as the pressure is still on the drain valve, the reversing valve and the flush water valve water from the hard water line proceeds up the pipe 106 through the open flush water valve through the port 90 to the valve member 89 through the pipe 87 into the top of the softener 88 out the bottom through the pipe 104 up through the passage way 110 into the drain 94, thus washing out the salt from the softening material so that the salt water cannot get into the service system.

During this period, the contact roller is on the contact cam 28 between the points 31 and 38. When it drops off of this last mentioned cam 28, the roller then rides upon the insulator. The solenoid 56 is de-energized, the pressure is relieved on the brine valve allowing it to close, the pressure is relieved on the reversing valve allowing it to open, the passageway of the hard water direct through the passageways 103 and 104 to the bottom of the softener, the pressure is relieved on the flush water valve allowing it to close and the pressure is relieved on the by-pass valve allowing it to close the direct hard water line and open the line from the softener to service.

It will be understood that I desire to comprehend within my invention such modifications as may be necessary to adapt it to varying conditions and uses.

Having thus fully described my invention, what I claim as new and desire to secure by Letters Patent, is:

1. In a water softener, a softening means, a regenerating means, means to convey hard water to the system, means to convey hard water to the regenerating means to force a regenerating solution therefrom into the softening means, a drain line, a flush water line, a flush water valve, a drain valve, a reversing valve, a regenerating material valve, means of operating said valves hydrostatically, means operated by the incoming hard water for controlling the hydrostatic means operating said valves.

2. In a water softener, a softening means, a regenerating means, means to convey hard water to the system, means to convey hard water to the regenerating means to force a regenerating solution therefrom into the softening means, a drain line, a flush water line, a flush water valve, a drain valve, a reversing valve, a regenerating material valve, means of operating said valves hydrostatically, means operated by the incoming hard water for controlling the hydrostatic means operating said valves, said last mentioned means being so arranged that the hard water will pass through the softener during softening in one direction, and will be shut off during regeneration and regenerating material passed therethrough in the other direction, the regenerating material will be shut off and flush water will be passed through the softener in the same direction and then the system will be restored to softening operation.

3. In a water softener, a softening means, a regenerating means, means to convey hard water to the system, means to convey hard water to the regenerating means to force a regenerating solution therefrom into the softening means, a drain line, a flush water line, a flush water valve, a drain valve, a reversing valve, a regenerating material valve, means of operating said valves hydrostatically, means operated by the incoming hard water for controlling the hydrostatic means operating said valves, said last mentioned means being so arranged that the hard water will pass through the softener during softening in one direction, and will be shut off during regeneration and regenerating material will be passed therethrough in the other direction, the regenerating material will be shut off and flush water will be passed through the softener in the same direction and then the system will be restored to softening operation, and a by-pass valve and a by-pass line from the hard water line to a service line whereby hard water will be by-passed to service and the softening mechanism will be shut off from the service line during regeneration.

4. In a water softener, a softening means, regenerating means, means conveying hard water to the system, means of conveying softening water to the system, means of draining the system, a drain valve, a reversing valve, a softening material valve, a flush water valve, means operated by the incoming hard water for controlling the operation of said valves, a pair of needle valves controlled thereby controlling the application of hard water to operate said valves.

5. In a water softener, a softening means, regenerating means, means conveying hard water to the system, means of conveying softening water to the system, means of draining the system, a drain valve, a reversing valve, a softening material valve, a flush water valve, means operated by the incoming hard water for controlling the operation of said valves, a pair of needle valves controlled thereby controlling the application of hard water to operate said valves, said controlling means consisting of a meter operated contact mechanism and electrical mechanism for acutating said needle valves.

6. In a water softener, a softening means, regenerating means, means conveying hard water to the system, means of conveying softening water to the system, means of draining the system, a drain valve, a reversing valve, a softening material valve, a flush water valve, means operated by the incoming hard water for controlling the operation of said valves, a pair of needle valves controlled thereby controlling the application of hard water to operate said valves, said controlling means consisting of a meter operated contact mechanism and electrical mechanism for actuating said needle valves, and means for closing one of said needle valves controlling the supply of regenerating means to the system prior to the closing of the needle valve controlling the application of flush water to the system whereby the system successively softens water, regenerates the softening material and flushes the softening material.

7. In a water softener characterized by having a softening means, a regenerating means, a service line and a hard water inlet line and communicating means in the hard water line to the bottom of the softener and a service line to the top of the softener and means of communication between the softener and the regenerating means, means actuated by the incoming hard water for controlling the alternate periods of softening and regeneration, needle valves controlled thereby, a brine valve controlled by one of said needle valves, a control valve, a reversing valve and a flush water valve controlled by either of said needle valves whereby the periods of softening and regeneration and the flushing thereof are controlled.

8. In a water softener characterized by having a softening means, a regenerating means, a service line and a hard water inlet line and communicating means in the hard water line to the bottom of the softener and a service line to the top of the softener and means of communication between the softener and the regenerating means, means actuated by the incoming hard water for controlling the alternate periods of softening and regeneration, needle valves controlled thereby, a brine valve controlled by one of said needle valves, a control valve, a reversing valve and a flush water valve controlled by either of said needle valves whereby the periods of softening and regeneration and the flushing thereof are controlled, and a by-pass valve and a by-pass line connected from the hard water line to the service line, said by-pass valve being controlled by one of said needle valves.

9. In a water softener characterized by having a softening means, a regenerating means, a service line and a hard water inlet line and communicating means in the hard water line to the bottom of the softener and a service line to the top of the softener and means of communication between the softener and the regenerating means, means actuated by the incoming hard water for controlling the alternate periods of softening and regeneration, needle valves controlled thereby, a brine valve controlled by one of said needle valves, a control valve, a reversing valve and a flush water valve controlled by either of said needle valves whereby the periods of softening and regeneration and the flushing thereof are controlled, and a by-pass valve and a by-pass line connected from the hard water line to the service line, said by-pass valve being controlled by one of said needle valves, and means for allowing said brine valve to close prior to the operation of the other valves at the end of the flushing operation.

10. In combination, a tank having softening material, a brine tank, means operated by the incoming hard water adapted to regulate the successive periods of softening, regeneration and flushing, a pair of master needle control valves controlled thereby, means of conveying hard water to and from said softener tank, means of conveying hard water to said brine tank, a drain line, a drain valve, a reversing valve, and a flush water valve, hydrostatic means from the hard water line to said drain valve, a reversing valve, a flush valve controlled by one of said needle valves and hydrostatic means from the hard water line to the brine valve controlled by the other of said needle valves.

11. In combination, a tank having softening material, a brine tank, means operated by the incoming hard water adapted to regulate the successive periods of softening, regeneration and flushing, a pair of master needle control valves controlled thereby, means of conveying hard water to and from said softener tank, means of conveying hard water to said brine tank, a drain line, a drain valve, a reversing valve, and a flush water valve, hydrostatic means from the hard water line to said drain valve, a reversing valve, a flush valve controlled by one of said needle valves and hydrostatic means from the hard water line to the brine valve controlled by the other of said needle valves, and electrical means adapted to actuate said needle valves in one direction and yielding means adapted to operate them in the other direction.

12. In combination, a tank having softening material, a brine tank, means operated by the incoming hard water adapted to regulate the successive periods of softening, regeneration and flushing, a pair of master needle control valves controlled thereby, means of conveying hard water to and from said softener tank, means of conveying hard water to said brine tank, a drain line, a drain valve, a reversing valve, and a flush water valve, hydrostatic means from the hard water line to said drain valve, a reversing valve, a flush valve controlled by one of said needle valves and hydrostatic means from the hard water line to the brine valve controlled by the other of said needle valves, and electrical means adapted to actuate said needle valves in one direction and yielding means adapted to operate them in the other direction, a by-pass valve adapted to control a by-pass line and the service line, a by-pass line, said by-pass valve being adapted to be actuted by the hydrostatic means controlled by one of said needle valves.

13. In a softener, a softener tank, a brine tank, a service line, a hard water inlet line connected to said tanks, means to connect the brine tank to the softener tank, a flush water line, a drain line, a drain valve, a reversing valve, a flush water valve, a brine valve adapted to control the brine line and the flush water line, means controlled by the incoming hard water for determining the period of softening, regeneration and flushing, needle valves operated thereby, one of said valves controlling the operation of a portion of the hydrostatic valves and the other needle valve controlling the other portion.

14. In a softener, a softener tank, a brine tank, a service line, a hard water inlet line connected to said tanks, means to connect the brine tank to the softener tank, a flush water line, a drain line, a drain valve, a reversing valve, a flush water valve, a brine valve adapted to control the brine line and the flush water line, means controlled by the incoming hard water for determining the period of softening, regeneration and flushing, needle valves operated thereby, one of said valves controlling the operation of a portion of the hydrostatic valves and the other needle valve controlling the other portion, and a hydrostatic valve adapted to close the service line from the softener and open the by-pass line from the hard water line to the service line and a by-pass line, said by-pass valve controlled by one of said needle valves.

15. In a softener characterized by having a softener material tank and a brine tank, mechanism in combination for controlling the softening, regeneration and flushing operations consisting of a hard water line, a meter operated thereby, electrical contacts intermittently operated thereby, electrical mechanism for operating needle valves controlled thereby, needle valves, a plurality of hydrostatic valves consisting of a drain valve, a reversing valve, a brine valve, a flush water valve, and a valve to shut off the service line from the softener, a drain line, a connection from the incoming hard water line to the softener and to the brine tank, a connection from the brine tank to the softener, a flush water connection from the hard water line to the softener.

16. In a softener characterized by having a softener material tank and a brine tank, mechanism in combination for controlling the softening, regeneration and flushing operations consisting of a hard water line, a meter operated thereby, electrical contacts intermittently operated thereby, electrical mechanism for operating needle valves controlled thereby, needle valves, a plurality of hydrostatic valves consisting of a drain valve, a reversing valve, a brine valve, a flush water valve, and a valve to shut off the service line from the softener, a drain line, a connection from the incoming hard water line to the softener and to the brine tank, a connection from the brine tank to the softener, a flush water connection from the hard water line to the softener, and a valve controlled by the valve shutting off the service from the softener adapted to open a by-pass line from the hard water line to the service line and a by-pass line.

17. In a softener, meter operated mechanism, cams driven thereby consisting of insulating cams, contact cams and a contact sleeve, a plurality of contact members, one of which engages said sleeve and the other of which engages said insulation and contact cams in succession, solenoids connected to said contact means, a source of electrical energy connected to said solenoids and to said contact sleeve whereby said solenoids are intermittently energized, and needle valves connected to said solenoids to be actuated thereby and hydrostatic pressure lines controlled by said needle valves whereby the hydrostatic pressure therein is controlled thereby.

18. In a softener, meter operated mechanism, cams driven thereby consisting of insulating cams, contact cams and a contact sleeve, a plurality of contact members, one of which engages said sleeve and the other of which engages said insulation and contact cams in succession, solenoids connected to said contact means, a source of electrical energy connected to said solenoids and to said contact sleeve whereby said solenoids are intermittently energized, and needle valves connected to said solenoids to be actuated thereby and hydrostatic pressure lines controlled by said needle valves whereby the hydrostatic pressure therein is controlled thereby, a plurality of hydrostatic valves adapted to control the softening, regeneration and flushing of said softener adapted to be actuated by said hydrostatic lines controlled by the needle valves.

19. In a softener, meter operated mechanism, cams driven thereby consisting of insulating cams, contact cams and a contact sleeve, a plurality of contact members, one of which engages said sleeve and the other of which engages said insulation and contact cams in succession, solenoids connected to said contact means, a source of electrical energy connected to said solenoids and to said contact sleeve whereby said solenoids are intermittently energized, and needle valves connected to said solenoids to be actuated thereby and hydrostatic pressure lines controlled by said needle valves whereby the hydrostatic pressure therein is controlled thereby, a plurality of hydrostatic valves adapted to control the softening, regeneration and flushing of said softener adapted to be actuated by said hydrostatic lines controlled by the needle valves, said valves consisting of a drain valve, a reversing valve, a flush water valve, and a by-pass valve.

20. In combination in a softener, control mechanism of a meter operated mechanism actuated by the passage of water through the system, a frictional driving mechanism operated thereby, a plurality of contact and contact breaking cams operated thereby, a contact sleeve, a plurality of contact members, one of which engages said sleeve and the other of which engages successively the contact and contact breaking cams, electrical means for connecting said contact members to a source of energy and to solenoids, solenoids, needle valves actuated thereby, yielding means for actuating said needle valves in the reverse direction and hydrostatic lines controlled by said needle valves.

21. In combination in a softener control mechanism of a meter operated mechanism actuated by the passage of water through the system, a frictional driving mechanism operated thereby, a plurality of contact and contact breaking cams operated thereby, a contact sleeve, a plurality of contact members, one of which engages said sleeve and the other of which engages successively the contact and contact breaking cams, electrical means for connecting said contact members to a source of energy and to solenoids, solenoids, needle valves actuated thereby, yielding means for actuating said needle valves in the reverse direction and hydrostatic lines controlled by said needle valves, and means for conveying hydrostatic pressure from the line which actuates said meter to said needle valves.

22. In combination in a softener control mechanism of a meter operated mechanism actuated by the passage of water through the system, a frictional driving mechanism operated thereby, a plurality of contact and contact breaking cams operated thereby, a contact sleeve, a plurality of contact members, one of which engages said sleeve and the other of which engages successively the contact and contact breaking cams, electrical means for connecting said contact members to a source of energy and to solenoids, solenoids, needle valves actuated thereby, yielding means for actuating said needle valves in the reverse direction and hydrostatic lines controlled by said needle valves, and means for conveying hydrostatic pressure from the line which actuates said meter to said needle valves, said needle valves having a common hydrostatic chamber and independent hydrostatic lines respectively controlled by the needle valves.

23. In combination in a softener control mechanism of a meter operated mechanism actuated by the passage of water through the system, a frictional driving mechanism operated thereby, a plurality of contact and contact breaking cams operated thereby, a contact sleeve, a plurality of contact members, one of which engages said sleeves and the other of which engages successively the contact and contact breaking cams, electrical means for connecting said contact members to a source of energy and to solenoids, solenoids, needle valves actuated thereby, yielding means for actuating said needle valves in the reverse direction and hydrostatic lines controlled by said needle valves, and means for conveying hydrostatic pressure from the line which actuates said meter to said needle valves, said needle valves having a common hydrostatic chamber and independent hydrostatic lines respectively controlled by the needle valves, and means to adjust said cams whereby said needle valves can be operated for different periods.

24. In combination in a softener control mechanism of a meter operated mechanism actuated by the passage of water through the system, a frictional driving mechanism operated thereby, a plurality of contact and contact breaking cams operated thereby, a contact sleeve, a plurality of contact members, one of which engages said sleeve and the other of which engages successively the contact and contact breaking cams, electrical means for connecting said contact members to a source of energy and to solenoids, solenoids, needle valves actuated thereby, yielding means for actuating said needle valves in the reverse direction and hydrostatic lines controlled by said needle valves, and means for conveying hydrostatic pressure from the line which actuates said meter to said needle valves, said needle valves having a common hydrostatic chamber and independent hydrostatic lines respectively controlled by the needle valves, and means to adjust said cams whereby said needle valves can be operated for different periods, and means to adjust the frictional driving elements operated by said meter.

25. In combination in a water softener, control mechanism consisting of a meter operated by the incoming hard water, means to multiply the action of said meter, means of applying the power therefrom to the rotation of a plurality of transmitting and insulating cams and a transmitting sleeve connected to the transmitting cams, a sleeve so connected, a shaft insulated from said cams adapted to support the cams and the sleeve, a plurality of contact members adapted to engage the sleeve and the respective pairs of transmitting and insulating cams in succession, a source of electrical current connected to said contact members, sleeve and transmitting cams, solenoids connected in said circuit with the source of current, needle valves controlled thereby, and hydrostatic means adapted to operate valves controlling the cycles of operation of the softener, said hydrostatic means being controlled by said needle valves.

26. In combination in a softener of control mechanism consisting of a meter driving mechanism and electrical contact mechanism and a single casing therefor having a valve casing connected thereto, an inlet and exit line for water passing through said meter having a port connected to said valve casing, needle valves therein, yielding means for actuating said valves in one direction, solenoids connected to electrical mechanism adapted to actuate the valves in the other direction and hydrostatic lines leading in the respective valves to control the successive periods of softening and regeneration.

27. In combination, a valve housing having a common inlet chamber, separated exit chambers, needle valves controlling the communication between the common chamber and the respective exit chambers, yielding means for moving said needle valves in one direction and electrical means adapted to operate said needle valves in the other direction.

28. In combination, a contact mechanism consisting of a rotating shaft, an insulating sleeve thereon, a contact sleeve thereon, insulating cams mounted on said sleeve, contact cams mounted on said sleeve and contact members, one of which engages said sleeve constantly and the others of which successively engage an insulating cam and contact cam.

29. In combination, a contact mechanism consisting of a rotating shaft, an insulating sleeve thereon, a contact sleeve thereon, insulating cams mounted on said sleeve, contact cams mounted on said sleeve and contact members, one of which engages said sleeve constantly and the others of which successively engage an insulating cam and contact cam, and means to adjust the insulating cam and contact cam of each pair with respect to each other to vary the time of contact with the contact member of the respective cam.

30. In combination in an automatic softener of a softening material tank, a brine tank, an incoming hard water line, meter operated mechanism for controlling the stages of softening, regeneration and flushing, a reversing valve adapted to control the application of hard water to the bottom of the softening tank, the passage of flushing water to the top of the softening tank and hard water to the bottom of the brine tank, pipes therefor, a flush water valve controlling the flush water line to the top of the softening tank, a brine valve adapted to alternately control the flush water line and a brine line from the top of the brine tank to the top of the softening tank, a brine line, a service line from the top of the softening tank, a valve controlling said service line, a drain line, a valve controlling the drain line, hydrostatic means for controlling said valves controlled by said meter operated mechanism whereby hard water is softened upwardly, brine is applied under hard water pressure downwardly to the softening material and out the drain line, and flush water is applied after the brine is cut off downwardly through the softening tank out the drain line.

31. In combination in an automatic softener of a softening material tank, a brine tank, an incoming hard water line, meter operated mechanism for controlling the stages of softening, regeneration and flushing, a reversing valve adapted to control the application of hard water to the bottom of the softening tank, the passage of flushing water to the top of the softening tank and hard water to the bottom of the brine tank, pipes therefor, a flush water valve controlling the flush water line to the top of the softening tank, a brine valve adapted to alternately control the flush water line and a brine line from the top of the brine tank to the top of the softening tank, a brine line, a service line from the top of the softening tank, a valve controlling said service line, a drain line, a valve controlling the drain line, hydrostatic means for controlling said valves controlled by said meter operated mechanism whereby hard water is softened upwardly, brine is applied under hard water pressure downwardly to the softening material and out the drain line, and flush water is applied after the brine is cut off downwardly through the softening tank out the drain line, a by-pass line to the service line and a valve controlling said by-pass line.

32. In combination in an automatic softener of a softening material tank, a brine tank, an incoming hard water line, meter operated mechanism for controlling the stages of softening, regeneration and flushing, a reversing valve adapted to control the application of hard water to the bottom of the softening tank, the passage of flushing water to the top of the softening tank and hard water to the bottom of the brine tank, pipes therefor, a flush water valve controlling the flush water line to the top of the softening tank, a brine valve adapted to alternately control the flush water line and a brine line from the top of the brine tank to the top of the softening tank, a brine line, a service line from the top of the softening tank, a valve controlling said service line, a drain line, a valve controlling the drain line, hydrostatic means for controlling said valves controlled by said meter operated mechanism whereby hard water is softened upwardly, brine is applied under hard water pressure downwardly to the softening material and out the drain line, and flush water is applied after the brine is cut off downwardly through the softening tank out the drain line, a by-pass line to the service line and a valve controlling said by-pass line, said control means being characterized by a pair of master needle control valves operated by the meter, one of said valves being adapted to control the operation of a portion of said valves and the other of said needle valves controlling the remainder thereof.

33. In combination in an automatic softener of a softening material tank, a brine tank, an incoming hard water line, meter operated mechanism for controlling the stages of softening, regeneration and flushing, a reversing valve adapted to control the application of hard water to the bottom of the softening tank, the passage of flushing water to the top of the softening tank and hard water to the bottom of the brine tank, pipes therefor, a flush water valve controlling the flush water line to the top of the softening tank, a brine valve adapted to alternately control the flush water line and a brine line from the top of the brine tank to the top of the softening tank, a brine line, a service line from the top of the softening tank, a valve controlling said service line, a drain line, a valve controlling the drain line, hydrostatic means for controlling said valves controlled by said meter operated mechanism whereby hard water is softened upwardly, brine is applied under hard water pressure downwardly to the softening material and out the drain line, and flush water is applied after the brine is cut off downwardly through the softening tank out the drain line, and means of applying hydrostatic pressure to said valves to operate them from the incoming hard water line.

34. In a water softening system characterized by having a brine tank and a softening tank, a hard water line, a meter therein, a pair of master control valves controlled thereby, hydrostatic valves controlling the softening, regeneration and flushing of the system, said hydrostatic valves being controlled in their operations by said master valves in such a way that the system is first devoted to softening then to regeneration through the application of brine controlled by one of said master valves and to the application of flush water by other of said valves.

In testimony whereof, I affix my signature.

CHARLES P. EISENHAUER.